United States Patent [19]

Silvestrini et al.

[11] Patent Number: 5,168,802
[45] Date of Patent: Dec. 8, 1992

[54] APPARATUS FOR PEELING FRUITS AND VEGETABLES

[75] Inventors: Jesus A. Silvestrini; Juan C. Morsucci, both of Mendoza, Argentina

[73] Assignee: Imdec S.A., Mendoza, Argentina

[21] Appl. No.: 855,609

[22] Filed: Mar. 20, 1992

[51] Int. Cl.⁵ .......................... A23N 7/00; A47J 17/00
[52] U.S. Cl. ........................ 99/587; 15/3.21; 99/540; 99/584; 99/623; 99/628
[58] Field of Search ............... 99/584, 585, 587, 539, 99/540, 567, 568, 574, 575, 593, 596, 623-630; 426/481-483; 15/3.19, 3.2, 3.21

[56] References Cited

U.S. PATENT DOCUMENTS

| 516,479 | 3/1894 | Dresser | 99/625 |
|---|---|---|---|
| 983,691 | 2/1911 | DeLong | 15/3.21 |
| 1,095,942 | 5/1914 | Stevens | 15/3.21 |
| 1,226,418 | 5/1917 | Trust | 99/587 |
| 1,274,663 | 8/1918 | Auer | 99/623 |
| 1,452,738 | 4/1923 | Hoberg | 99/626 |
| 2,228,410 | 1/1941 | Sharma et al. | 99/587 |
| 2,792,005 | 5/1957 | Lee . | |
| 4,068,574 | 1/1978 | Amstad | 99/587 |
| 4,444,096 | 4/1984 | Silvestrini et al. | 99/585 |
| 4,509,414 | 4/1985 | Chiu et al. | 99/585 |
| 4,770,887 | 9/1988 | Tarry et al. | 426/482 |
| 4,990,353 | 2/1991 | Van DerSchoot | 426/483 |
| 5,033,372 | 7/1991 | Silvestrini | 99/625 |

FOREIGN PATENT DOCUMENTS

| 2602249 | 8/1976 | Fed. Rep. of Germany | 99/626 |
|---|---|---|---|
| 443520 | 12/1948 | Italy | 99/587 |

Primary Examiner—Timothy F. Simone
Attorney, Agent, or Firm—Pettis & McDonald, P.A.

[57] ABSTRACT

Apparatus for peeling fruits and vegetables comprises a plurality of rotatably driven peeling elements having predetermined axes of rotation that are generally horizontal and substantially parallel to one another. The peeling elements have a provision for engaging the peel of the fruits and vegetables. A plurality of flexible, elongate, peeling enhancement fingers, each having a first end and a second end, are mounted to the apparatus above the peeling elements by their first ends. The first ends lie in a generally horizontal row that is generally parallel to the axes of rotation of the peeling elements. The fingers extend generally toward the peeling elements with the second end of each finger being proximal at least two peeling elements, so that the finger engages the item of fruit or vegetable being engaged by the adjacent peeling elements. A support structure provides support for the peeling elements, fingers and drive mechanism.

10 Claims, 2 Drawing Sheets

APPARATUS FOR PEELING FRUITS AND VEGETABLES

BACKGROUND OF THE INVENTION

This invention relates generally to apparatus for peeling fruits and vegetables. More particularly, it relates to apparatus for removing the skin from such fruits and vegetables on which the skin has already been loosened by immersion in a hot liquid solution, by steam, or by steam and vacuum. In a typical process of this nature the fruits and vegetables, which may typically include apricots, nectarines, plums, applies, pears, tomatoes, potatoes or other types, are initially immersed in a hot caustic solution or treated with steam, which causes the peel to be loosened from the flesh of the fruit or vegetable but not removed from it.

A number of different methods have been developed to complete the removal of the skin from the fruit or vegetable. A common method is the use of storing jets of water that flush the loosened peel from the fruit or vegetable. While this procedure is effective, it produces large volumes of waste liquid containing the water from the jets, the pieces of peel and traces of the caustic solution. This waste liquid presents disposal and pollution problems that are becoming unacceptable for commercial operations.

In order to reduce the excessive use of water and the production of waste liquid, apparatus has been developed to remove the loosened skins by abrasion, pinching by rollers and by other similar devices. Two such devices are described in the applicant's patents U.S. Pat. Nos. 4,444,096 and 5,033,372, in which a plurality of rotatable peeling elements are supported on a support structure for rotation. The peeling elements engage the fruit or vegetable to be peeled. As the vegetables or fruit move from one element to the next the items to be peeled often rotate in the same direction about their axes leaving areas of the item that do not come into engagement with the peeling elements.

SUMMARY OF THE INVENTION

In order to overcome the deficiencies of the conventional peeling technology, it is an object of this invention to provide an improvement to the apparatus that increases the contact of the peeling elements with the items to be peeled, causes rotation of the item to be peeled to increase exposure of that item's skin to the scraping action of the peeling elements and to provide additional abrasive contact with the item. To achieve these objects, a set of flexible, elongate peeling enhancement fingers is mounted above a plurality of rotatably driven peeling elements. The rotatable peeling elements have axes of rotation that are generally parallel with one another and extend generally horizontally. Each peeling element has a means for engaging the peel of the fruits and vegetables. The flexible and elongate fingers have a first end and a second end, with the first end of the fingers being supported by a support means above the peeling elements. The fingers extend generally toward the peeling elements, so that the second ends of the fingers are each located proximal to an adjacent pair of the peeling elements.

BRIEF DESCRIPTION OF THE DRAWINGS

A particularly preferred embodiment of the peeling apparatus of this invention is illustrated in the drawings in which.

DETAILED DESCRIPTION

Figure 1:
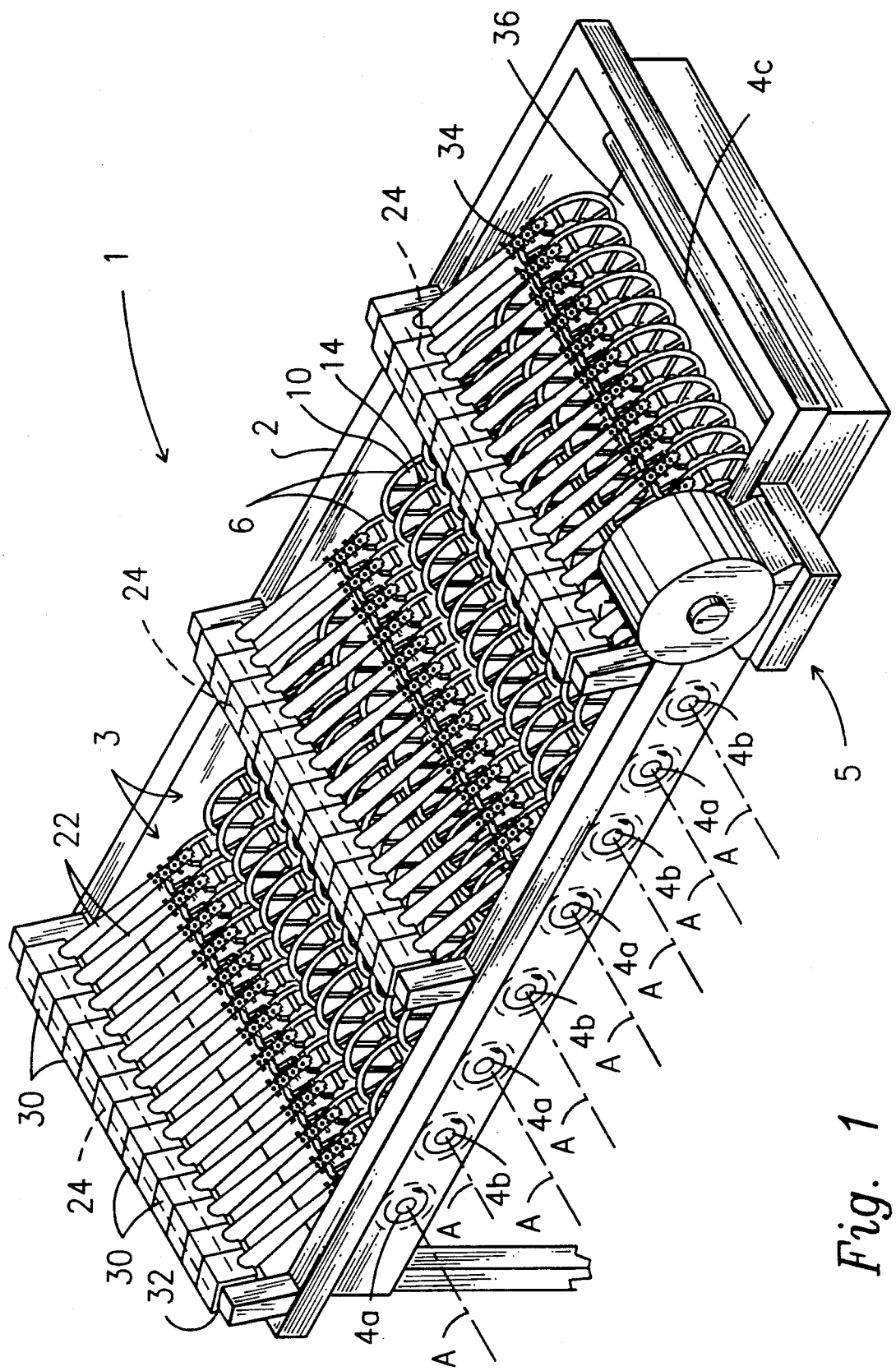
FIG. 1 is an upper perspective view of a preferred embodiment of the apparatus of this invention.

A particularly preferred embodiment of the improved peeling apparatus of the present invention is illustrated in FIGS. 1 through 4 of the drawings, in which the apparatus is generally indicated as 1. This apparatus comprises a support means, suitably in the form of a support frame 2, that may be formed in any convenient and conventional manner, such as by welded sheet metal or the like. To the support frame 2 are mounted a plurality of rotatably driven peeling elements, generally indicated by reference numeral 3, extending horizontally and having substantially parallel axes of rotation A. The peeling elements 3 are mounted to the support frame 2 in a conventional manner, such as that described by the applicant's U.S. Pat. No. 5,033,372, which discloses a conventional drive system having an electric motor with a gear reducer that is connected through a series of chains and sprockets to peeling elements. The drive system in the current invention is generally indicated as 5.

The peeling elements in this preferred embodiment comprise a plurality of means for engaging the peel of the fruits and vegetables, conveniently pairs of adjacent discs 6 mounted on shafts 4 and 4b. In another embodiment, the peeling elements may be adjacent pairs of rollers that pinch and pull the loosened peel between adjacent rollers to remove the peel from the fruit or vegetable, in a manner such as disclosed in U.S. Pat. No. 4,444,096. Other suitable means for engaging the peel that are known in the art may also be used. The shafts are fabricated of a suitable material such as a steel alloy and, in this embodiment may comprise a first set 4a and a second set 4b with one of the second set of shafts 4b interposed between each adjacent pair of the first set of shafts 4a. This arrangement, along with the drive system 5, is described in U.S. Pat. No. 5,033,372.

Figure 2:
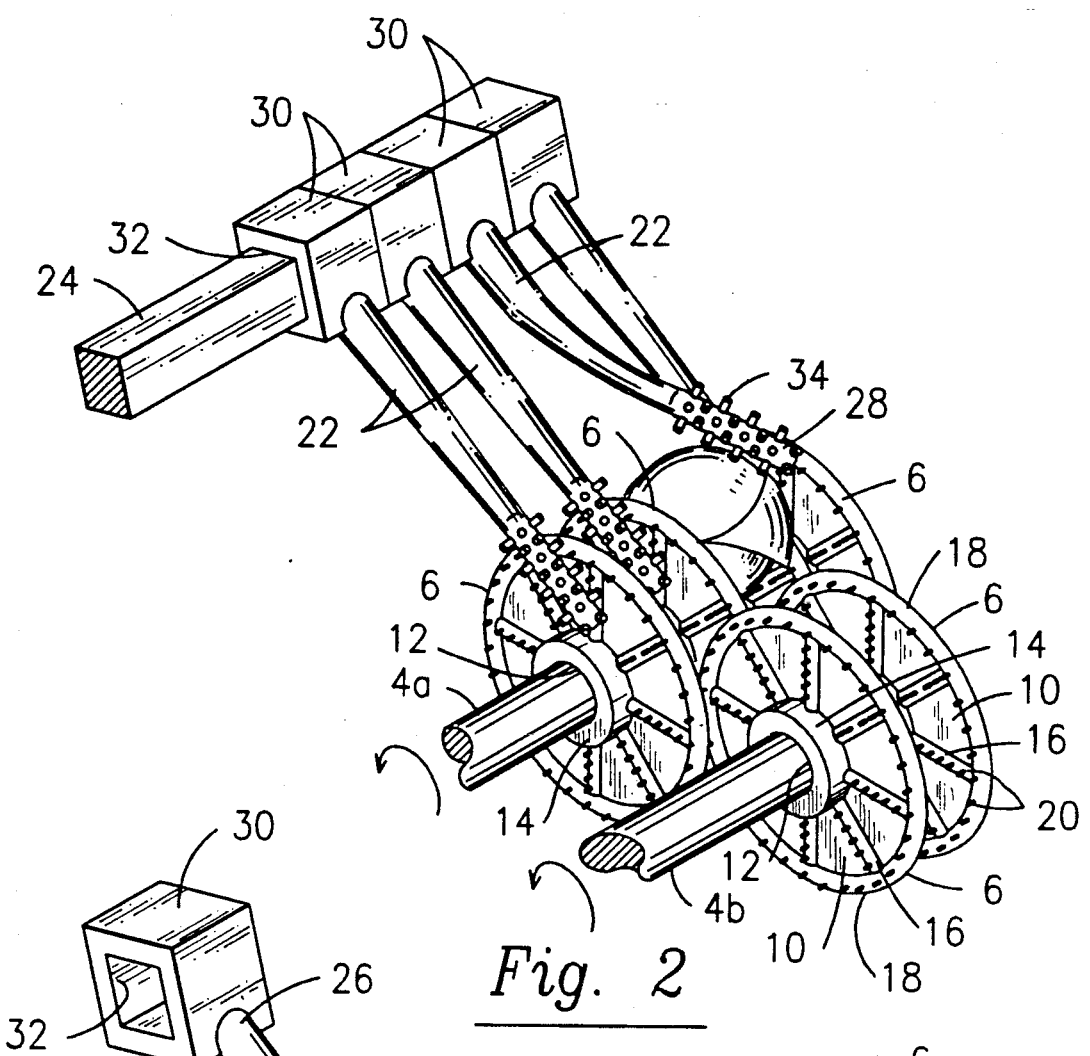
FIG. 2 is a detailed fragmentary perspective view of a portion of the apparatus of FIG. 1.
Figure 3:
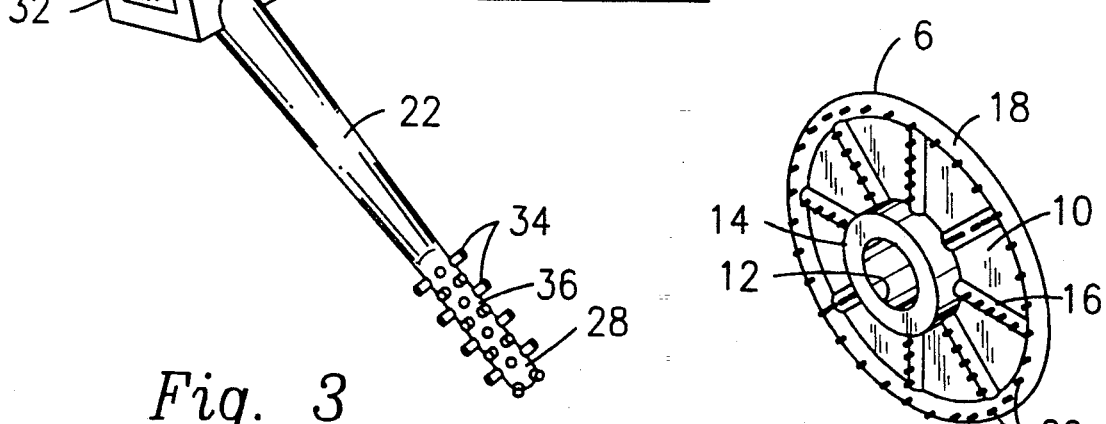
FIG. 3 is a perspective view of a peeling enhancement finger of FIGS. 1 and 2.
Figure 4:
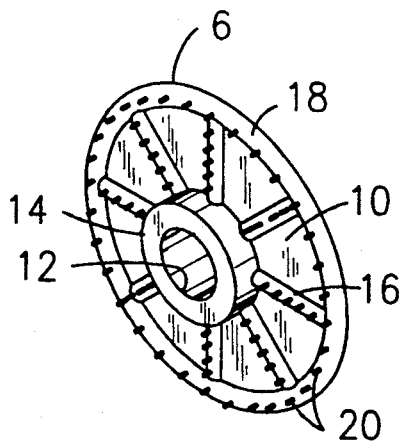
FIG. 4 is a perspective view of one of the peeling discs of FIGS. 1 and 2.

The peeling discs 6, preferably configured as in FIG. 4 and as mounted on the shafts 4a and 4b, are axially adjacent to one another. Each of these discs 6, which may suitably be formed of a flexible synthetic polymeric material, has a flexible, radially extending portion 10 for engaging an item to be peeled, generally in the manner illustrated in FIG. 2 and as described in U.S. Pat. No. 5,033,372. As shown in FIG. 1 and 2 the discs 6 on each shaft 4a preferably are axially staggered with respect to the discs 6 on the adjacent shaft 4b, and those shafts 4 are positioned to provide for interleaving of the discs on adjacent such shafts 4a and 4b, as shown most clearly in FIG. 2. Each of these discs 6 is affixed in a conventional manner to its respective shaft 4 such that rotation of the shaft 4 will effect the same rotation of each of the discs 6 thereon.

As shown in FIG. 2, each of the peeling discs 6 comprises a radially extending portion 10 of a conventional polymeric material such as synthetic rubber or the like, having a predetermined thickness and sufficient flexibility to deflect upon engagement with an item to be peeled, as shown in FIG. 2. Disc 6 has a central aperture 12 surrounded by a thickened hub 14 to support the disc 6 on its respective shaft 4a or 4b. The thickness of this hub portion 14 is also selected to provide appropriate spacing between adjacent such discs 6 when the discs 6 are stacked on a shaft 4 as shown in FIGS. 1 and 2.

In the preferred embodiment illustrated each peeling disc 6 also includes a plurality of generally radially extending thickened rib portions 16 that extend outwardly from the shaft 4 or hub portion 14 to a point proximal to the outer periphery of the disc 6. Preferably, the peeling discs 6 also include thickened annular rim portion 18 extending about the outer periphery of the disc 6. As shown most clearly in FIG. 4, the radially outermost portion of each of the rib portions 16 preferably intersects the thickened rim portion 18. To further enhance the peeling functions of this apparatus, each of the peeling discs 6 of this embodiment suitably also include a plurality of projections 20 extending generally axially outwardly of at least one of the rib portions 16, and suitably from the thickened rim portion 18, whereby those projections 20 provide additional roughness to the surface of the disc 6 to assist in the peeling action thereof.

A set of elongated, flexible peeling enhancement fingers 22, each having a first end 26 and a second end 28, is mounted on the apparatus such that the first ends 26 lie in a generally horizontal row. In the preferred embodiment the first ends 26 are conveniently mounted on a shaft 24 having an axis that extends generally parallel to the axes of rotation A of the peeling elements 3. In other embodiments the first ends 26 may be mounted on any convenient structure that provides such support to the first ends 26 of the fingers 22. The shaft 24 is supported above the shafts 4 by attachment to the support frame 2. The first ends 26 of the fingers 22 are connected to the shaft 24 so that the fingers 22 extend generally toward the discs 6, and the second end 28 of each finger 22 extends between a respective pair of adjacent peeling elements, which, in this embodiment, are discs 6. While each finger 22 may be mounted directly to the shaft 24 by clamping, insertion of the first end 26 into a receptacle or other means known in the art, in the preferred embodiment, each finger is mounted to or molded integrally with a spacer 30 that has a polygonal opening 32 therethrough and that is sized and configured to be received upon the shaft 24. The spacer 30 has a predetermined thickness which is sized to provide the appropriate spacing between the adjacent fingers 22 when mounted on the shaft 24 to ensure that the second end 28 of each of the fingers 22 extends between a respective pair of adjacent discs 6.

In the preferred embodiment one shaft 24 holding a plurality of fingers 22 is used in conjunction with every third row of peeling elements 3. In FIG. 1, three rows of fingers and nine peeling elements are shown for illustration purposes. For actual use, for example with tomatoes, a bed typically containing 30 rows of peeling means 3 and 9 rows of fingers 22 may provide the best results.

Each finger 22 preferably has a roughened surface portion, conveniently a plurality of projections 34, that are provided to improve the efficiency of the skin removal process. In the preferred embodiment the projections that extend vertically downward toward the fruit (not shown) are shorter than the adjacent projections. Each elongate finger 22 is generally circular in cross section and has a central axis extending longitudinally thereof, and the projections 34 extend generally radially outwardly from the axis of the finger 22. The size of the projections 34, or other types of roughened surfaces, including but not restricted to sandpaper-like areas, scraper-like projections and so forth, is determined by the type of skin of the fruit or vegetable being peeled.

Each of the fingers 22 may suitably be formed of a resiliently flexible synthetic polymeric material which must be capable of withstanding the cleaning necessary to maintain sanitary conditions, particularly if the produce is not to be washed after being peeled. In addition, in the preferred embodiment, the material preferably has a highly elastic memory, so that it retains its original shape.

With a preferred embodiment of the apparatus of this invention having been described in detail above, the operation may now be described. The unit illustrated in FIG. 1 is elevated at the end at which the fruit or vegetables are introduced into the peeling apparatus (left end in FIG. 1) so that the produce slowly tumbles down the inclined bed of the peeling discs 6 to the discharge gap 36 at the right end of FIG. 1. As described in U.S. Pat. No. 5,033,372, differing rotational speeds are applied to alternating shafts 4a and 4b, which preferably rotate in a counter-clockwise direction when viewed as in FIG. 1, and thus rotate the peeling discs 6 mounted thereon in the same fashion. Such differing rotational speeds serve to alternately accelerate and decelerate the motion of the fruit or vegetables as they tumble down the incline of the machine, increasing the frictional engagement and peeling action of the discs 6.

As an item is engaged by a pair of adjacent rotating discs, the item may also be engaged by a flexible finger 22, which applies pressure to the item forcing it to more fully engage the pair of discs 6, resulting in increased contact with the projections 20 of the discs 6 and therefore more efficient loosening and removal of the skin. In addition, the projections 34 on the second end 28 of the fingers 22 further abrade and scrape the skin from the item. Due to the flexibility of the fingers, as the item advances past a finger 22, the finger 22 may move from engagement with the top portion of the item to engage the side of the item, providing a rotational movement to the item. This rotation of the item is generally transverse to the direction of advancement of the items down the incline so that different portions of the skin of the items are now engaged by the discs 6. Thus, most areas of the skin of the fruits or vegetables are exposed to the scraping and abrading action for a more complete removal of the skin in a shorter period of time.

The fruit or vegetable peel that is removed during this process falls between the spaced shafts 4a and 4b, which are positioned sufficiently closely to prevent the fruit or vegetable items from falling through. These portions of the peel are then collected in a suitable receptacle for subsequent disposal or use as desired. The peeled fruits or vegetables are discharged from the apparatus by falling through the space, discharge gap 36, between the last shaft 4b and the drive shaft 4c. The peeled fruit or vegetables are collected into a suitable receptacle for further processing.

While the foregoing describes a particularly preferred embodiment of the apparatus of this invention, it is to be recognized that numerous variations and modifications of the apparatus of this invention will readily occur to those skilled in the art. Accordingly, the foregoing description is to be considered illustrative only of the principles of the invention and is not to be considered limitative thereof. The scope of the invention is to be defined solely by the claims appended hereto.

What is claimed is:

1. Improved apparatus for peeling fruits and vegetables, comprising, in combination a plurality of rotatably driven peeling elements, each having a predetermined axis of rotation with the axes of said plurality of elements being generally parallel to one another and extending generally horizontally, said peeling elements including means for engaging the peel of said fruits and vegetables;

a set of peeling enhancement fingers comprising a plurality of flexible elongate fingers formed of a resilient synthetic resin, said fingers having a first end and a second end, said first ends of each said set of fingers being mounted on said apparatus such that said first ends lie in a generally horizontal row which extends generally parallel to said peeling element axes of rotation, said second ends of said fingers being supported above at least two adjacent said peeling elements such that said second end of said fingers engage said fruits or vegetables being engaged by said adjacent peeling elements; and support means for supporting said peeling elements and said fingers.

2. The apparatus of claim 1 further comprising a plurality of said sets of said peeling enhancement fingers with each said set being associated with a different pair of said adjacent peeling elements.

3. The apparatus of claim 1 wherein said peeling element further comprises a rotatably driven shaft having a substantially horizontal axis and a plurality of discs affixed thereto for rotation therewith, each said disc having a flexible radially extending portion for engaging an item to be peeled.

4. The apparatus of claim 3 wherein said second end of each said finger extends between a pair of adjacent said discs, whereby the fingers engage the fruits and vegetables being engaged by such a pair of adjacent discs.

5. The apparatus of claim 1 wherein each said elongate finger further comprises a roughened surface proximal to said second end, whereby said roughened surface assists in the peeling action of said fingers.

6. The apparatus of claim 5 wherein said roughened surface of said fingers comprises a plurality of projections extending generally outwardly therefrom.

7. The apparatus of claim 6 wherein each said elongate finger is generally circular in cross section with a central axis extending longitudinally thereof, and wherein said projections extend generally radially outwardly from said axis of said finger.

8. Peeling enhancement fingers for use with apparatus for peeling fruits and vegetables in which a plurality of rotatably driven peeling elements engage and remove the peel from fruits and vegetables placed thereupon, each said finger comprising a flexible elongated member formed of a resilient, flexible synthetic resin and having a first end for mounting said member to said peeling apparatus and a second, opposed end for engaging said fruit or vegetable, said first end including means for receiving and at least partially surrounding a support shaft carried by said peeling apparatus, whereby the member is supportable on the peeling apparatus, and said second end including a plurality of projections extending generally outwardly therefrom.

9. The peeling enhancement finger of claim 8 wherein said support shaft receiving means comprises an aperture in said member for receiving said support shaft therethrough.

10. The peeling enhancement finger of claim 9 wherein said aperture is of polygonal shape.

* * * * *